(12) United States Patent
Morris et al.

(10) Patent No.: US 9,915,174 B1
(45) Date of Patent: Mar. 13, 2018

(54) AERATED SQUEEZE-FILM DAMPER

(71) Applicant: UNITED TECHNOLOGIES CORPORATION, Farmington, CT (US)

(72) Inventors: Robert J. Morris, Portland, CT (US); Gregory M. Savela, Stuart, FL (US); Daniel L. Gysling, South Glastonbury, CT (US); Richard A. Lomenzo, Enfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/420,308

(22) Filed: Jan. 31, 2017

(51) Int. Cl.
| | |
|---|---|
| *F16C 27/04* | (2006.01) |
| *F01D 25/16* | (2006.01) |
| *F04C 2/14* | (2006.01) |
| *F04C 2/34* | (2006.01) |
| *F16C 33/72* | (2006.01) |
| *F16F 9/02* | (2006.01) |

(52) U.S. Cl.
CPC ............. *F01D 25/164* (2013.01); *F04C 2/14* (2013.01); *F04C 2/34* (2013.01); *F16C 27/045* (2013.01); *F16C 33/72* (2013.01); *F16F 9/02* (2013.01); *F05D 2220/32* (2013.01); *F05D 2240/54* (2013.01); *F05D 2240/55* (2013.01); *F05D 2240/60* (2013.01); *F16C 2360/23* (2013.01); *F16F 2222/126* (2013.01); *F16F 2230/30* (2013.01)

(58) Field of Classification Search
CPC .................................................... F16C 27/045
See application file for complete search history.

(56) References Cited

U.S. PATENT DOCUMENTS

2016/0369652 A1* 12/2016 Morris ................... F01D 25/18

\* cited by examiner

*Primary Examiner* — Thomas R Hannon
(74) *Attorney, Agent, or Firm* — Snell & Wilmer, L.L.P.

(57) ABSTRACT

A bearing assembly is provided. The bearing assembly may include an inner race configured to couple to a shaft, an outer race disposed around the inner race, a bearing support structure coupled to the outer race, and a housing disposed around the bearing support structure. The housing and the bearing support structure may define a squeeze-film damper annulus configured to receive an aerated damping fluid. The aerated damping fluid may be provided from a fluid pump and an air supply port.

20 Claims, 3 Drawing Sheets

AERATED SQUEEZE-FILM DAMPER

FIELD

The present disclosure relates generally to gas turbine engines, and more specifically, to aerated squeeze-film dampers for gas turbine engines.

BACKGROUND

Gas turbine engines typically comprise bearings which support rotating shafts. The bearings may comprise an inner race which rotates with the shaft, and a plurality of rollers between the inner race and an outer race, which does not rotate. The shaft may whirl and deflect from the engine centerline. Squeeze-film dampers may be used to damp the whirling. In a squeeze-film damper, a thin annulus of oil is typically retained between the outer race and/or a bearing support structure and a bearing housing. Oil may be fed into the annulus to form the squeeze-film damper which damps whirling of the shaft. Typically, the annulus is sealed to prevent air from reaching the squeeze-film damper and to allow the squeeze-film damper to achieve higher levels of dynamic pressure.

SUMMARY

In various embodiments, a bearing assembly is disclosed. The bearing assembly may comprise an inner race coupled to the shaft; an outer race disposed around the inner race; a bearing support structure coupled to the outer race; a housing disposed around the bearing support structure, wherein the housing and the bearing support structure define a squeeze-film damper annulus configured to contain an aerated damping fluid; and an air supply port in fluid communication with the squeeze-film damper annulus. The air supply port may be configured to supply an airflow to aerate a damping oil and generate the aerated damping fluid.

In various embodiments, the bearing assembly may comprise a fluid pump in fluid communication with the squeeze-film damper annulus, wherein the fluid pump is configured to supply the damping oil. The fluid pump may comprise a positive-displacement pump. In various embodiments, the bearing assembly may comprise an orifice plate in fluid communication with the air supply port, wherein the orifice plate is configured to control a flow of the supplied airflow. In various embodiments, the air supply port may be configured to supply the airflow to aerate the damping oil upstream from an inlet of the fluid pump. In other embodiments, the air supply port may be configured to supply the airflow to aerate the damping oil downstream from an outlet of the fluid pump. In various embodiments, the bearing assembly may comprise a first seal and a second seal disposed between the outer race and the housing, wherein the first seal and the second seal define an axial boundary of the squeeze-film damper annulus.

In various embodiments, a squeeze film damper may comprise an outer race having an annular geometry; a bearing support structure coupled to the outer race; a housing disposed about the bearing support structure; a first seal and a second seal between the bearing support structure and the housing, wherein the housing, the bearing support structure, the first seal, and the second seal define a squeeze-film damper annulus; and an aerated damping fluid contained within the squeeze-film damper annulus.

In various embodiments, the squeeze-film damper may comprise a fluid pump in fluid communication with the squeeze-film damper annulus, wherein the fluid pump is configured to supply a damping fluid. In various embodiments, the squeeze-film damper may comprise an air supply port in fluid communication with the fluid pump, wherein the air supply port is configured to supply an airflow to aerate the damping fluid and generate the aerated damping fluid. In various embodiments, the squeeze-film damper may comprise an orifice plate in fluid communication with the air supply port, wherein the orifice plate is configured to control a flow of the supplied airflow. The air supply port may be configured to supply the airflow to aerate the damping fluid upstream from an inlet of the fluid pump. The air supply port may also be configured to supply the airflow to aerate the damping fluid downstream from an outlet of the fluid pump.

In various embodiments, a gas turbine engine is disclosed. The gas turbine engine may comprise a shaft; an inner bearing race coupled to the shaft; an outer bearing race disposed around the inner bearing race, wherein the shaft and the inner bearing race are configured to rotate within the outer bearing race; a bearing support structure coupled to the outer bearing race; a housing surrounding the bearing support structure, wherein the outer bearing race is configured to whirl within the housing, and wherein a squeeze-film damper annulus is defined between the bearing support structure and the housing. The squeeze-film annulus may be configured to contain an aerated damping fluid.

In various embodiments, the gas turbine engine may comprise a fluid pump in fluid communication with the squeeze-film damper annulus, wherein the fluid pump is configured to supply a damping oil. In various embodiments, the gas turbine engine may comprise an air supply port in fluid communication with the fluid pump, wherein the air supply port is configured to supply an airflow to aerate the damping oil and generate the aerated damping fluid. The gas turbine engine may comprise an orifice plate in fluid communication with the air supply port, wherein the orifice plate is configured to control a flow of the supplied airflow. The air supply port may be configured to supply the airflow to aerate the damping oil upstream from an inlet of the fluid pump. The air supply port may also be configured to supply the airflow to aerate the damping oil downstream from an outlet of the fluid pump. In various embodiments, the gas turbine engine may also comprise a first seal and a second seal disposed between the outer race and the housing, wherein the first seal and the second seal define an axial boundary of the squeeze-film damper annulus.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with a tail (e.g., the back end) of an aircraft, or generally, to the direction of exhaust of gas turbine engine 100. As used herein, "forward" refers to the direction associated with a nose (e.g., the front end) of the aircraft, or generally, to the direction of flight or motion. As utilized herein, radially inward refers to the negative R direction and radially outward refers to the R direction. An A-R-C axis is shown throughout the figures to illustrate the relative position of various components.

Figure 1:
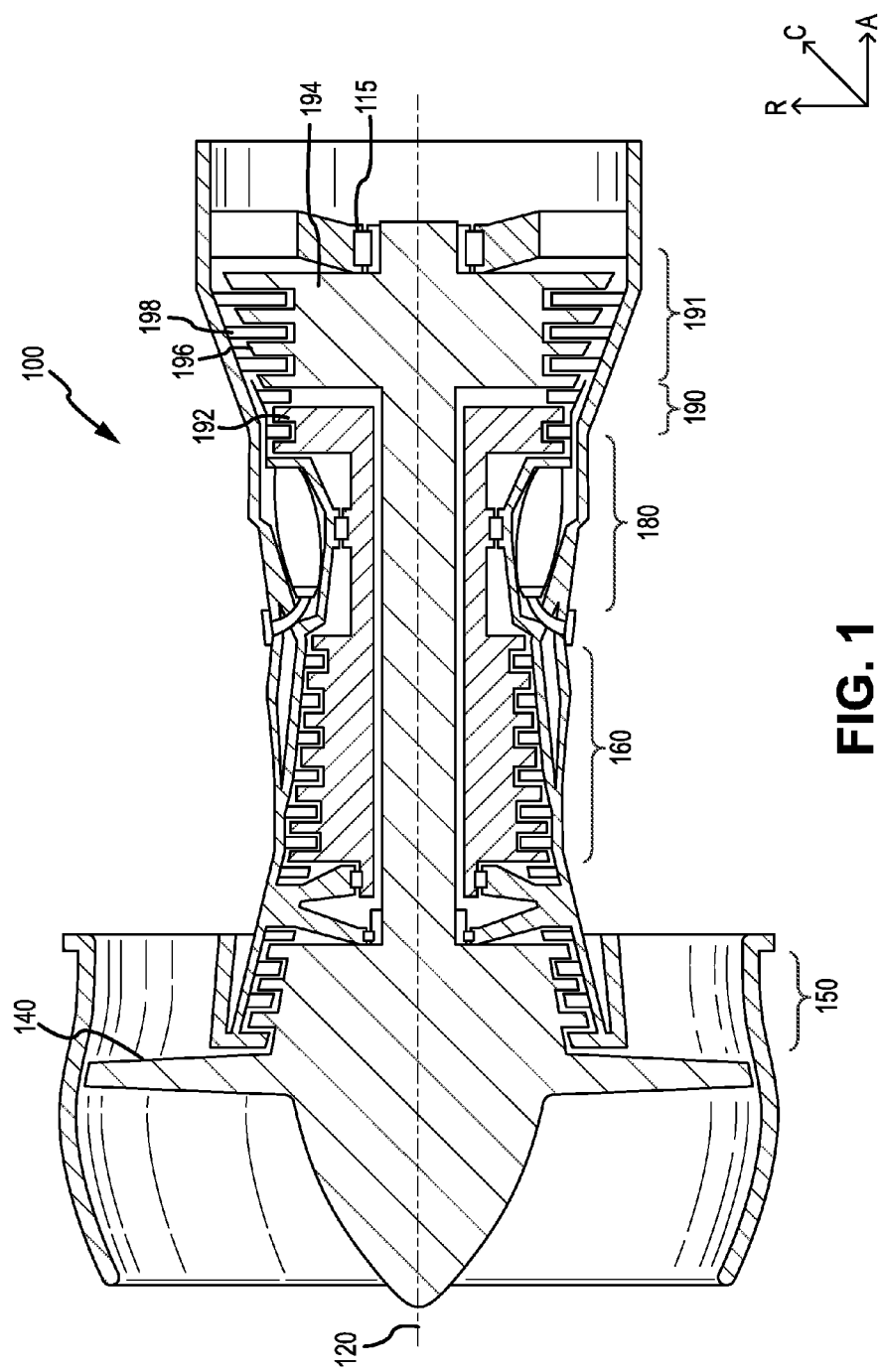
FIG. 1 illustrates an exemplary gas turbine engine, in accordance with various embodiments.

In various embodiments, and with reference to FIG. 1, a gas turbine engine 100 (such as a turbofan gas turbine engine) is depicted. Gas turbine engine 100 is disposed about engine centerline 120, which may also be referred to as axis of rotation 120. Gas turbine engine 100 may comprise a fan 140, compressor sections 150 and 160, a combustion section 180 including a combustor, and turbine sections 190, 191. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the combustor and turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of rotating machinery, turbomachinery, and pumps, including turbofan gas turbine engines and turbojet engines, for all types of applications. This may also extend when used in combination with other bearing types in said applications including journal type bearings.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
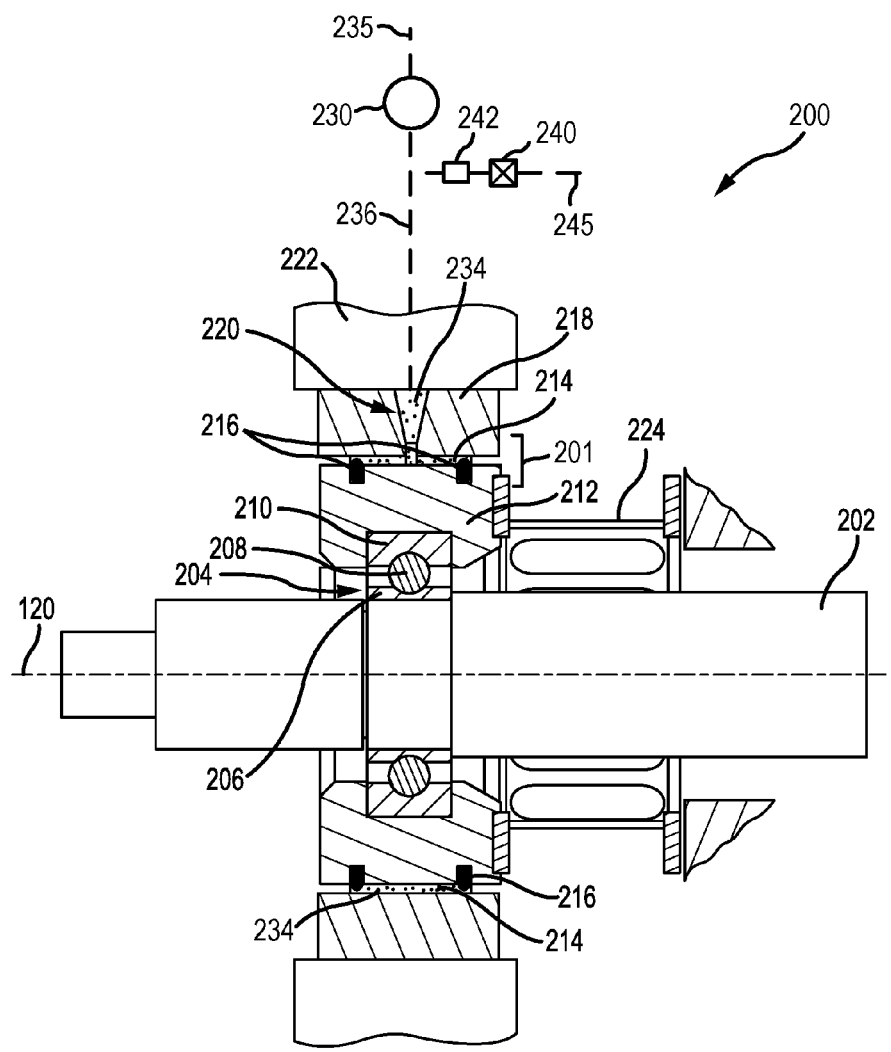
FIG. 2 illustrates a cross-sectional view of a bearing assembly having an aerated squeeze-film damper with a fluid pump upstream from an air supply port, in accordance with various embodiments.

With reference to FIG. 2, an exemplary bearing assembly 200 with an aerated squeeze-film damper is shown in cross section, in accordance with various embodiments. Bearing assembly 200 may include a shaft 202 configured to rotate about engine centerline 120. Although an engine is used for exemplary purposes, squeeze-film dampers of the present disclosure may be used in various embodiments where damping is desired. Shaft 202 may engage an inner race 206 of a bearing 204, which also rotates about engine centerline 120. Bearing 204 may be defined by inner race 206 (e.g., an inner bearing race), an outer race 210 (e.g., an outer bearing race), and a rolling element 208 (e.g., spherical balls, cylindrical rollers, and/or the like) disposed between outer race 210 and inner race 106. Outer race 210 may be rotationally stationary about engine centerline 120. In that regard, inner race 106 rotates while outer race 210 remains stationary. Rolling elements 208 may rotate and decrease friction between inner race 206 and outer race 210 as inner race 106 rotates relative to outer race 210. Outer race 210 may comprise an annular geometry.

In various embodiments, bearing assembly 200 may comprise a squeeze-film damper 201. Squeeze-film damper 201 may be configured to attenuate periodic deflection relative to axis of rotation 120, as discussed further herein. Squeeze-film damper 201 may include a bearing support structure 212. In various embodiments, bearing support structure 212 may be coupled to outer race 210 and may be configured to engage seal 216. Seal 216 may also be configured to engage a housing 218. A squeeze-film damper annulus 214 may be defined between bearing support structure 212 and housing 218 with seals 216 (e.g., a first seal and a second seal) defining the axial boundaries of squeeze-film damper annulus 214. Squeeze-film damper annulus 214 may be at least partially sealed by seals 216. Seals 216 may comprise any suitable seal capable of at least partially sealing squeeze-film damper annulus 214, such as, for example, a piston-ring seal, an O-ring seal, and/or the like. Squeeze-film damper annulus 214 may be configured to retain a damping fluid such as, for example, oil and/or an aerated damping fluid 234, as discussed further herein. The damping fluid may be delivered through passage 220 into squeeze-film damper annulus 214. A portion of the damping fluid, heated by the shearing of the damping fluid in squeeze-film damper annulus 214, may leak by seals 216 in an axial direction, and additional, cooler damping fluid may be supplied to squeeze-film damper annulus 214 via passage 220. A static structure 222 may be disposed radially outward from bearing assembly 200 and configured to retain bearing assembly 200 in a radial direction. A damper centering spring 224 may be disposed forward and/or aft of bearing support structure 212, and may be configured to retain bearing assembly 200 in an axial direction. A radial stiffness of damper centering spring 224 may be established based on the structural dynamics of the gas turbine engine 100 and/or various subsystems, and the effectiveness of squeeze-film damper 201.

In various embodiments, bearing assembly 200 may comprise a variety of components configured to generate an aerated damping fluid 234, and provide the aerated damping fluid 234 to squeeze-film damper 201. Aerated damping fluid 234 may comprise an aerated fluid, such as, for example aerated oil. For example, aerated damping fluid 234 may be created by combining a damping fluid (e.g., oil) with an airflow via a Venturi effect, by introducing the airflow at a higher pressure relative to the pressure of the damping fluid, and/or any other suitable method of interspersing airflow into the damping fluid, allowing the airflow to aerate the damping fluid.

As discussed further herein, and in various embodiments, aerated damping fluid 234 may increase damping performance (e.g., damping and stiffness, rotor and case response) in squeeze-film damper 201 of bearing assembly 200 compared to the use of only damping fluid. By tailoring the introduction of the airflow into the damping fluid, a pressure profile of aerated damping fluid 234 may be changed and controlled. In that respect, varying the introduction of the airflow over an operating range of the gas turbine engine may provide a mechanism for varying and controlling stiffness and damping properties of aerated damping fluid 234. Aerated damping fluid 234 may better control rotor resonance in order to reduce response amplitude and transmissibility of rotor response to the engine structure.

For example, and in various embodiments, bearing assembly 200 may comprise a fluid pump 230. Fluid pump 230 may be in fluid communication with squeeze-film damper annulus 214, via passage 220. Fluid pump 230 may be configured to pressurize and/or supply a damping fluid (e.g., oil). Fluid pump 230 may comprise any suitable pump capable of pressurizing and/or supplying the damping fluid. For example, fluid pump 230 may comprise a positive-displacement pump, such as, for example, a rotary vane pump, a gear pump, and/or the like. Fluid pump 230 may receive the damping fluid from a fluid source 235 (e.g., an oil supply system, an oil tank, etc.).

In various embodiments, bearing assembly 200 may also comprise an air supply port 240. Air supply port 240 may be configured to provide an air flow to bearing assembly 200 to aerate the damping fluid. Air supply port 240 may comprise a solenoid valve, and/or any other suitable valve, configured to control the flow of air. Air supply port 240 may also comprise a fixed port, adjustable port, and/or the like configured to introduce air. Air supply port 240 may receive the airflow from an air source 245 (e.g., an air tank, ambient air, etc.). Air supply port 240 may be in fluid communication with an orifice plate 242. Orifice plate 242 may be configured to meter and/or control the airflow from air supply port 240. For example, orifice plate 242 may be in electronic communication with a processor, a controller, and/or the like, configured to communicate with orifice plate 242 to control the release of airflow. In that respect, the ratio of air to damping fluid may be controlled to generate aerated damping fluid 234 having tailored damping and stiffness characteristics.

In various embodiments, fluid pump 230 and air supply port 240 may be in fluid communication with passage 220 via an aerated fluid passage 236. In that regard, the damping fluid provided by fluid pump 230 and the airflow provided by air supply port 240, via orifice plate 242, may be combined in aerated fluid passage 236 to generate aerated damping fluid 234. For example, the damping fluid may be combined with the airflow in aerated fluid passage 236 via a Venturi effect, by introducing the airflow at a higher pressure relative to the pressure of the damping fluid, and/or the like, allowing the airflow to aerate the damping fluid.

In various embodiments, air supply port 240 and orifice plate 242 may be located in any suitable location relative to fluid pump 230. For example, and as depicted in FIG. 2, air supply port 240 and/or orifice plate 242 may be located downstream of fluid pump 230, and may be in fluid communication with a discharge (or an outlet) of fluid pump 230. In that respect, the damping fluid from fluid source 235 may be aerated by the airflow released from orifice plate 242, via air supply port 240 and air source 245, after the damping fluid is pumped through fluid pump 230.

Figure 3:
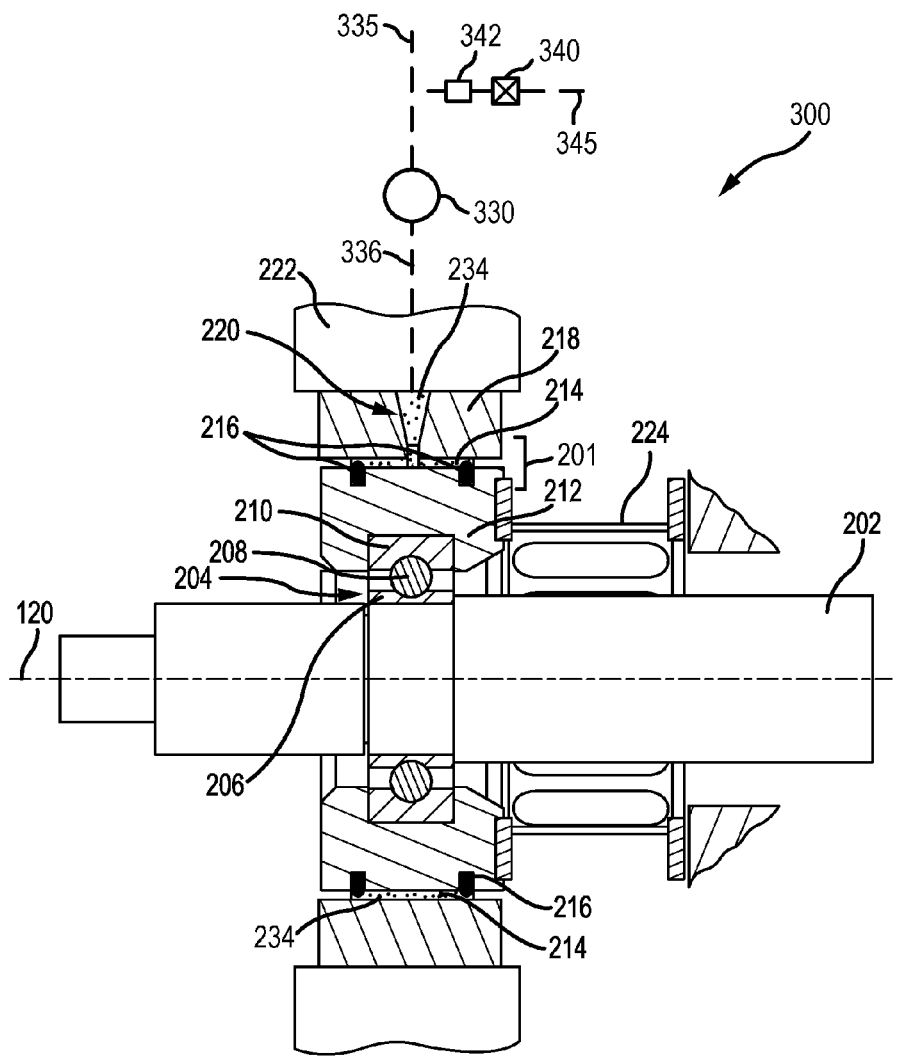
FIG. 3 illustrates a cross-sectional view of a bearing assembly having an aerated squeeze-film damper with a fluid pump downstream from an air supply port, in accordance with various embodiments.

In various embodiments, and with reference to FIG. 3, an air supply port 340 and/or an orifice plate 342 may also be located upstream of fluid pump 330, and may be in fluid communication with a suction (or an inlet) of fluid pump 330. In that respect, the damping fluid from fluid source 335 may be aerated by the airflow released from orifice plate 342, via air supply port 340 and air source 245, before reaching fluid pump 330. In various embodiments, the damping fluid may also be aerated using any other suitable method, and/or with any other suitable lubrication system configuration.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A bearing assembly for a shaft configured to rotate about an axis, comprising:
    an inner race coupled to the shaft;
    an outer race disposed around the inner race;
    a bearing support structure coupled to the outer race;
    a housing disposed around the bearing support structure, wherein the housing and the bearing support structure define a squeeze-film damper annulus configured to contain an aerated damping fluid; and
    an air supply port in fluid communication with the squeeze-film damper annulus, wherein the air supply port is configured to supply an airflow to aerate a damping oil and generate the aerated damping fluid.

2. The bearing assembly of claim 1, further comprising a fluid pump in fluid communication with the squeeze-film damper annulus, wherein the fluid pump is configured to supply the damping oil.

3. The bearing assembly of claim 2, wherein the fluid pump comprises a positive-displacement pump.

4. The bearing assembly of claim 2, wherein the air supply port is configured to supply the airflow to aerate the damping oil upstream from an inlet of the fluid pump.

5. The bearing assembly of claim 2, wherein the air supply port is configured to supply the airflow to aerate the damping oil downstream from an outlet of the fluid pump.

6. The bearing assembly of claim 1, further comprising a first seal and a second seal disposed between the outer race and the housing, wherein the first seal and the second seal define an axial boundary of the squeeze-film damper annulus.

7. The bearing assembly of claim 1, further comprising an orifice plate in fluid communication with the air supply port, wherein the orifice plate is configured to control the supplied airflow.

8. A squeeze-film damper, comprising:
    an outer race having an annular geometry;
    a bearing support structure coupled to the outer race;
    a housing disposed about the bearing support structure;
    a first seal and a second seal between the bearing support structure and the housing, wherein the housing, the bearing support structure, the first seal, and the second seal define a squeeze-film damper annulus; and
    an aerated damping fluid contained within the squeeze-film damper annulus.

9. The squeeze-film damper of claim 8, further comprising a fluid pump in fluid communication with the squeeze-film damper annulus, wherein the fluid pump is configured to supply a damping fluid.

10. The squeeze-film damper of claim 9, further comprising an air supply port in fluid communication with the fluid pump, wherein the air supply port is configured to supply an airflow to aerate the damping fluid and generate the aerated damping fluid.

11. The squeeze-film damper of claim 10, further comprising an orifice plate in fluid communication with the air supply port, wherein the orifice plate is configured to control the supplied airflow.

12. The squeeze-film damper of claim 10, wherein the air supply port is configured to supply the airflow to aerate the damping fluid upstream from an inlet of the fluid pump.

13. The squeeze-film damper of claim 10, wherein the air supply port is configured to supply the airflow to aerate the damping fluid downstream from an outlet of the fluid pump.

14. A gas turbine engine, comprising:
    a shaft;
    an inner bearing race coupled to the shaft;
    an outer bearing race disposed around the inner bearing race, wherein the shaft and the inner bearing race are configured to rotate within the outer bearing race;
    a bearing support structure coupled to the outer bearing race;
    a housing surrounding the bearing support structure, wherein the outer bearing race is configured to whirl within the housing, and wherein a squeeze-film damper annulus is defined between the bearing support structure and the housing, and wherein the squeeze-film annulus is configured to contain an aerated damping fluid.

15. The gas turbine engine of claim 14, further comprising a fluid pump in fluid communication with the squeeze-film damper annulus, wherein the fluid pump is configured to supply a damping oil.

16. The gas turbine engine of claim 15, further comprising an air supply port in fluid communication with the fluid pump, wherein the air supply port is configured to supply an airflow to aerate the damping oil and generate the aerated damping fluid.

17. The gas turbine engine of claim 16, further comprising an orifice plate in fluid communication with the air supply port, wherein the orifice plate is configured to control a flow of the supplied airflow.

18. The gas turbine engine of claim 16, wherein the air supply port is configured to supply the airflow to aerate the damping oil upstream from an inlet of the fluid pump.

19. The gas turbine engine of claim 16, wherein the air supply port is configured to supply the airflow to aerate the damping oil downstream from an outlet of the fluid pump.

20. The gas turbine engine of claim 14, further comprising a first seal and a second seal disposed between the outer race and the housing, wherein the first seal and the second seal define an axial boundary of the squeeze-film damper annulus.

* * * * *